Dec. 16, 1924.
J. A. COSTELLO
1,519,604
FAUCET
Filed April 23, 1923
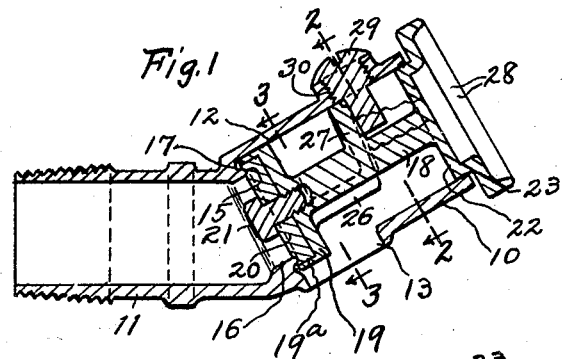
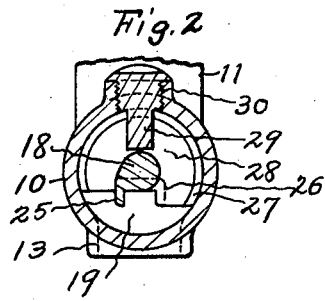
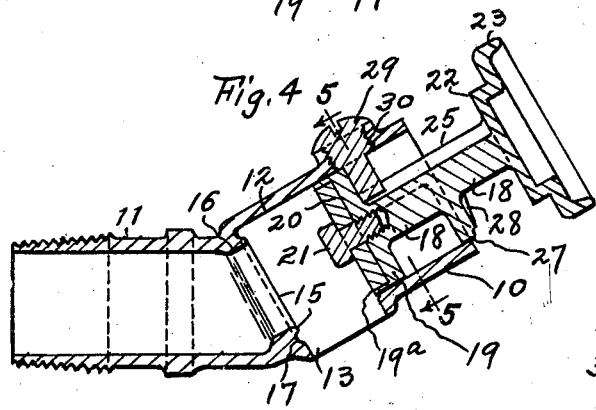
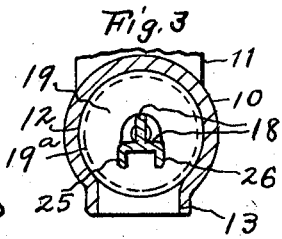
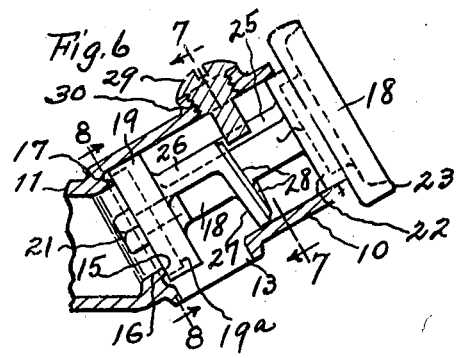
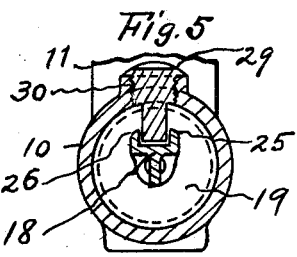
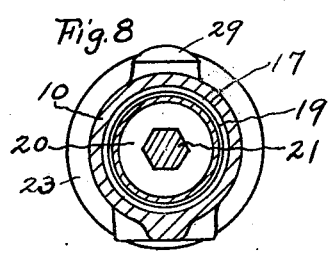
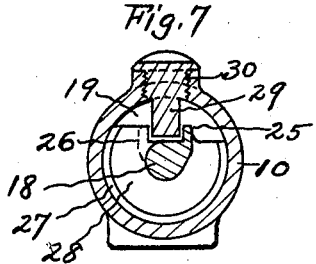
Inventor:
Joseph A. Costello
By his Attorney.

Patented Dec. 16, 1924.

1,519,604

UNITED STATES PATENT OFFICE.

JOSEPH A. COSTELLO, OF CLEVELAND, OHIO, ASSIGNOR TO THE CLEVELAND BRASS MANUFACTURING COMPANY, OF CLEVELAND, OHIO, A CORPORATION OF OHIO.

FAUCET.

Application filed April 23, 1923. Serial No. 633,851.

*To all whom it may concern:*

Be it known that I, JOSEPH A. COSTELLO, a citizen of the United States, residing at Cleveland, in the county of Cuyahoga and State of Ohio, have invented a new and useful Faucet, of which the following is a specification.

This invention relates to improvements in faucets, and pertains more especially to a faucet well adapted for use in connection with a metal oil-barrel and comprising a casing which has a tubular member adapted to be secured to and placed in communication with the barrel and has an interior chamber having a fluid-outlet and fluid-inlet which communicates with said tubular member and is surrounded by a forwardly facing seat for a valve employed in controlling communication through said inlet and having a sliding or rectilinear movement from its fully open position toward said seat and after said movement forceable into fluid-tight engagement with said seat during the required rotation of the valve.

One object of this invention is to produce a faucet of the character indicated having convenient and highly practical means suitable for effecting said engagement of the valve with said seat during said rotation of the valve and essentially comprising a pin which is rigid with the hereinbefore mentioned casing and accessible at the exterior of the casing and arranged to be engaged by a forwardly facing surface which is formed on the valve and arranged, in relation to said pin after the hereinbefore mentioned sliding or rectilinear movement of the valve as required to render said surface capable of cooperating with said pin in forcing the valve into a tightly closed position during said rotation of the valve.

Another object is to employ a valve having a body which comprises a rigid core extending endwise of the casing and a head formed at the rearward end of and rigid with said core and having bearing in the casing in any position of the valve and also comprising a head formed at the forward end of and rigid with the core and having bearing in the casing in the closed position of the valve and arranged externally of the casing in the fully open position of the valve.

Another object is to have the hereinbefore mentioned surface formed on a circumferential flange which is arranged between and spaced from the ends of and formed on the core of the valve and preferably has bearing in the casing in any position of the valve and extends circumferentially of the axis of the valve preferably more than one half and less than the full distance around said axis, and to have said surface extending circumferentially and endwise of said axis and arranged as required to cooperate with the hereinbefore mentioned pin in effecting a fluid-tight closing of the valve during less than a full turn of the valve about its axis after the hereinbefore mentioned movement of the valve from its fully open position toward and against the valve-seat.

Another object is to utilize the head formed, as hereinbefore indicated, at the rearward end of the core of the valve in cooperating with said pin in arresting the valve after the rectilinear movement of the valve into its fully open position.

Another object is to provide said core with two longitudinal flanges which are unequal in length and spaced circumferentially of the axis of the valve, to utilize said flanges in cooperating with said pin in preventing objectionable rotation of the valve in opposite directions respectively in the fully open position of the valve.

Another object is to utilize said pin and said longitudinal flanges in guiding the valve during the rectilinear movement of the valve from its fully open position toward the valve-seat preliminary to rotation of the valve in the direction required to force the valve into tight engagement with the valve-seat, and to utilize the longer longitudinal flange of the valve-core in preventing rotation of the valve in the opposite direction after said rectilinear movement of the valve.

Another object is to facilitate the assemblage of the component parts of the faucet, and to render the faucet simple and durable in construction.

With these objects in view, and to attain any other object hereinafter appearing, this invention consists in certain features of construction, and combinations and relative arrangements of parts, hereinafter described in this specification, pointed out in the claims, and illustrated in the accompanying drawings.

In said drawings, Figure 1 is a central vertical longitudinal section of a faucet embodying my invention and shows the valve of the faucet tightly closed. Figs. 2 and 3 are transverse sections taken along the line 2—2 and line 3—3 respectively in Fig. 1. Fig. 4 is a central vertical longitudinal section and shows the valve in its fully open position. Fig. 5 is a transverse section taken along the line 5—5 in Fig. 4. Fig. 6 is a side view of the valve and shows the valve-surrounding casing in central section. Figs. 7 and 8 are transverse sections taken along the line 7—7 and line 8—8 respectively in Fig. 6.

Referring to said drawings, 10 indicates the metal casing of my improved faucet, and said casing comprises a substantially horizontal tubular member 11 screw-threaded externally and adapted to be threaded into the head of an oil-barrel. Said casing is tubular and extends upwardly and forwardly from the member 11 and has an interior chamber 12 having a fluid-outlet formed by a downwardly discharging aperture 13 with which the bottom of said casing is provided adjacent the forward end of said member 11. The casing 10 has an internal forwardly facing valve-seat 15 rearward of and higher than the outlet 13. The chamber 12 has a fluid-inlet formed by an aperture 16 in and centrally of the rear end wall of said chamber, and said inlet is surrounded by the seat 15. The casing 10 also has an internal annular recess 17 which surrounds the seat 15, and the fluid-outlet 13 is preferably formed adjacent said recess.

My improved faucet comprises a valve arranged to control communication through the fluid-inlet 16 of the chamber 12 and having a metal body comprising a rigid core 18 which is arranged substantially centrally of and extends endwise of the casing 10. Said valve-body also comprises an externally circular head 19 formed at the rearward end of and rigid with the core 18. The head 19 has bearing in the casing 10 in any position of the valve and, at its forward side, has a circular recess 19ª occupied by a disk or member 20 composed of elastic and compressible material such, for instance, as rubber and arranged to form the face of the valve and removably secured in place by a suitably applied screw 21. The valve-body also comprises an externally circular head 22 which is formed at the forward end of and rigid with the core 18 and has bearing in the casing 10 in the closed position of the valve, as shown in Figs. 1 and 8, and said head is provided with a member 23 arranged externally of the casing in any position of the valve and contoured to form a handle for manipulating the valve.

The core 18 also has two longitudinal flanges 25 and 26 which are unequal in length and spaced circumferentially and extend endwise of the axis of the valve. The longer longitudinal flange 25 extends between and to the heads 19 and 22, and the shorter longitudinal flange 26 extends from the rearward head 19 forwardly to a point substantially central between said heads.

The valve of my improved faucet has a sliding or rectilinear movement from its fully open position shown in Fig. 4 toward and against the valve-seat 15 as shown in Fig. 6, and after said movement the valve is capable of limited rotation to the right and forceable into fluid-tight engagement with said seat during said rotation of the valve, and the core 18 is provided with a circumferential flange 27 which extends from the forward end of the shorter longitudinal flange 26 leftward circumferentially of the axis of the valve to the longer longitudinal flange 25. The circumferential flange 27 preferably has bearing, at its outer circumference, in the casing 10 in any position of the valve and, at its forward side, has a surface 28 facing forwardly in the direction of the handle 23 of the valve and extending from the forward end of the shorter longitudinal flange 26 leftward circumferentially of the axis of the valve and somewhat forwardly.

The casing 10 is provided, a suitable distance forward of the valve-seat 15, with a pin 29 which is arranged substantially radially in relation to the valve and engages a correspondingly screw-threaded and correspondingly arranged hole 30 formed in the casing and therefore removably secured to and rigid with said casing, and said pin has its inner end portion plain and arranged internally of said casing.

By the hereinbefore described construction it will be observed that the shorter longitudinal flange 26 is formed at one end and wholly rearward of the circumferential flange 27, that the longer longitudinal flange 25 extends both forwardly and rearwardly from and is formed at the other end of said circumferential flange, and that the forwardly facing surface 28 of said circumferential flange is arranged to engage and to be pressed against by the rear side of the inner end portion of the pin 29 during the rotation of the valve in the required direction after the sliding or rectilinear movement of the valve from its fully open position shown in Fig. 4 toward and against the valve-seat 15 as shown in Fig. 6, and preferably the relative arrangement of the parts is such that said side of said portion of said pin and said surface 28 of the valve cooperate in forcing the valve into tight engagement with said seat, as shown in Fig. 1, during the rotation of the valve to the right upon said sliding or rectilinear movement of the valve.

The relative arrangement of the parts is such that in the fully open position of the valve the head 19 abuts against the rear side of the pin 29, as shown in Fig. 4, and cooperates with said pin in forming a stop for the rectilinear movement of the valve into said position from the position shown in Fig. 6, that said pin extends between the longitudinal flanges 25 and 26 in the fully open position of the valve, as shown in Figs. 4 and 5, and that the head 22 of the valve-body is arranged to have bearing in the casing 10 between said pin and the forward extremity of the casing when the valve is in its closed position, and it will be observed that the valve-body has bearing in the casing in any position of the valve and independent of said head.

Preferably the longer longitudinal flange 25 is arranged to cooperate with the pin 29 in preventing rotation of the valve to the left during and after the sliding or rectilinear movement of the valve from its fully open position shown in Fig. 4 toward and against the valve-seat. The shorter longitudinal flange 26 is spaced such a distance rearwardly from the forward end of the longer longitudinal flange 25 that the shorter longitudinal flange, after said movement of the valve from the position shown in Fig. 4 into the position shown in Fig. 6, is wholly rearward of the pin 29 so as to permit said shorter longitudinal flange to clear said pin in the last-mentioned position of the valve and thereby avoid interference with the rotation of the valve to the right when the valve is in the position shown in Fig. 6, and in the last-mentioned position of the valve the surface 28 is arranged to be brought into engagement with the rear side of said pin and to have pressure exerted thereon by said pin during said rotation of the valve to the right as required to force the valve at its face into fluid-tight engagement with the valve-seat 15. The relative arrangement of the parts is such that said seat is somewhat embedded in the elastic and compressible member 20 of the valve, as exaggeratively illustrated in Fig. 1, when the valve is in its tightly closed position, and the recess 17 accommodates the location of the flange 19ª of the head 19 in said tightly closed position of the valve.

Preferably the circumferential flange 27 of the valve-core 18 extends circumferentially of the axis of the valve somewhat more than one-half of and less than the full distance around said axis, and less than a full turn of the valve about its axis to the right is required to effect fluid-tight engagement of the valve with the valve-seat 15. Obviously in the tightly closed position of the valve a forcible turn of the valve to the left is required preliminary to movement of the valve into its fully open position, and the shorter longitudinal flange 26 is arranged as required to cooperate with the pin 29 in preventing or limiting leftward rotation of the valve in the fully open position of the valve as shown in Fig. 5.

What I claim is—

1. A faucet comprising a casing having an internal valve-seat and an interior chamber which has a fluid-outlet and a fluid-inlet which is surrounded by said seat, a pin rigid with and arranged substantially radially of the casing and spaced forwardly from said seat and having its inner end portion internally of the casing, and a valve having bearing in the casing and controlling communication through the aforesaid inlet and capable of limited rotation in one direction after movement of the valve from its fully open position toward said seat and having a rigid core extending endwise of the casing, said core having a flange which is spaced forwardly from the forward end and extends circumferentially of the core and at its forward side has a forwardly facing surface extending circumferentially and endwise of the axis of the valve and arranged to engage the rear side of the aforesaid pin and to have pressure exerted thereon by said pin during the aforesaid rotation of the valve.

2. A faucet comprising a casing having an internal valve-seat and an interior chamber which has a fluid-outlet and a fluid-inlet which is surrounded by said seat, a pin rigid with the casing and spaced forwardly from said seat and having its inner end portion internally of the casing, and a valve controlling communication through the aforesaid inlet and capable of limited rotation in one direction after movement of the valve from its fully open position toward said seat and having a body which has bearing in the casing and comprises a rigid core extending endwise of the casing, said core having a flange which is spaced forwardly from the forward end and extends circumferentially of the core and has a forwardly facing surface extending circumferentially of and endwise of the axis of the valve and arranged to engage the rear side of the aforesaid pin and to cooperate with said pin in forcing the valve into tight engagement with the aforesaid seat during the aforesaid rotation of the valve, and the valve-body being provided at the rearward end of the core with a forwardly facing surface arranged to abut against the rear side of said pin in the fully open position of the valve.

3. A faucet comprising a casing having an internal valve-seat and an interior chamber which has a fluid-outlet and a fluid-inlet which is surrounded by said seat, a pin rigid with the casing and spaced forwardly from said seat and having its inner end portion internally of the casing, and a valve controlling communication through the aforesaid inlet and capable of limited rotation in one direction after movement of the valve from its fully open position toward said seat and having a body comprising a rigid core which is disposed substantially central in relation to and extends endwise of the casing, said core having a circumferential flange which is spaced rearwardly from the forward end of the core and has a forwardly facing surface extending circumferentially and endwise of the axis of the valve and arranged to engage the rear side of and to be pressed against by the aforesaid pin during said rotation of the valve, and the valve having bearing in the casing adjacent the rearward end of the core and at the outer circumference of said flange in any position of the valve.

4. A faucet comprising a casing having an internal valve-seat and an interior chamber having a fluid-outlet and a fluid-inlet which is surrounded by said seat, a pin rigid with the casing and spaced forwardly from said seat and having its inner end portion internally of the casing, and a valve controlling communication through the aforesaid inlet and capable of rotation in one direction after movement of the valve from its fully open position toward said seat and having a body comprising an externally circular head which is rigid with said core and arranged to have bearing in the casing between the aforesaid pin and the forward extremity of the casing when the valve is in its closed position, said core having a circumferential flange which is arranged between and spaced from the ends of the core and has a forwardly facing surface extending circumferentially and endwise of the axis of the valve and arranged to have pressure exerted against it by said pin during the aforesaid rotation of the valve, and the valve having bearing in the casing in any position of the valve and independent of the aforesaid head.

5. A faucet comprising a casing having an internal forwardly facing valve-seat and an interior chamber having a fluid-outlet and a fluid-inlet which is surrounded by said seat, a pin rigid with the casing and spaced forwardly from said seat and having a portion thereof internally of the casing, and a valve controlling communication through said inlet and capable of rotation after endwise movement of the valve toward said seat and having a body which has bearing in the casing and comprises a rigid core extending endwise of the casing, said core having two flanges which extend endwise of the core and are unequal in length and spaced circumferentially of the axis of the valve, the longer flange having its side which faces toward the shorter flange opposite the aforesaid pin during and after the aforesaid endwise movement of the valve, said pin extending between said flanges in the fully open position of the valve and being clear of the shorter flange after said endwise movement of the valve to permit the rotation of the valve in the direction in which said side of the longer flange faces, and the valve having a forwardly facing surface extending circumferentially and endwise of said axis and arranged to have pressure exerted against it by said pin during said rotation of the valve.

6. A faucet comprising a casing having an internal forwardly facing valve-seat and an interior chamber which has a fluid-outlet and a fluid-inlet which is surrounded by said seat, and a valve controlling communication through the said inlet and capable of limited rotation in one direction after movement of the valve from its fully open position toward said seat and having a body which has a rigid core disposed substantially central in relation to and extending endwise of the casing and comprises an externally circular head at the rearward end of and rigid with said core and having bearing in the casing in any position of the valve, the valve comprising an elastic and compressible disk secured to said head and arranged to form the face of the valve, said head having a flange surrounding said elastic and compressible member, the casing having an internal recess surrounding the valve-seat and arranged opposite said flange, and said casing and the aforesaid core being provided between the forward end of said core and the aforesaid head with means whereby the valve is forced into tight engagement with said seat during the aforesaid rotation of the valve.

7. A faucet comprising a casing having an internal forwardly facing valve-seat and an interior chamber having a fluid-outlet and a fluid-inlet which is surrounded by said seat, and a valve controlling communication through said inlet and capable of rotation in one direction after movement of the valve from its fully open position toward said seat and having a body which has a rigid core extending endwise of the casing and comprises an externally circular head at the rearward end of and rigid with the core and having bearing in the casing in any position of the valve, the valve comprising an elastic and compressible member secured to said head and arranged to form the face of the valve, the valve-body comprising an externally circular-head at the forward end of and rigid with the core and having bearing in the casing when the valve is closed, and said casing and the core being provided between said heads with means whereby the valve is forced into tight engagement with the valve-seat during the aforesaid rotation of the valve.

8. A faucet comprising a casing having an internal forwardly facing valve-seat and an interior chamber having a fluid-outlet and a fluid-inlet which is surrounded by said seat, a pin rigid with the casing and spaced forwardly from said seat and having a portion thereof internally of the casing, and a valve controlling communication through said inlet and having bearing in the casing and a substantially rectilinear movement from its fully open position toward said seat and having a body which comprises a rigid core extending endwise of the casing and having a flange which is arranged between and spaced from the ends of the core and extends circumferentially of the axis of the valve more than one-half and less than the full distance around said axis, said core also having a longitudinal flange which is formed at one end and wholly rearward of the circumferential flange and also having a longitudinal flange extending forwardly and rearwardly at the other end of the circumferential flange, and said circumferential flange having a forwardly facing surface extending forwardly from the first-mentioned longitudinal flange and arranged to have pressure exerted against it by the aforesaid pin during the required rotation of the valve after the aforesaid rectilinear movement of the valve.

9. A faucet comprising a casing having an internal forwardly facing valve-seat and a fluid-outlet and a fluid-inlet which is surrounded by said seat, a pin rigid with the casing and spaced forwardly from said seat and extending internally of the casing, and a valve controlling communication through the aforesaid inlet and having a substantially rectilinear movement from its fully open position toward said seat and having a body which has bearing in the casing and comprises a rigid core having two spaced longitudinal flanges unequal in length and extending the one forward of the other, said core also having a circumferential flange which extends from the forward end of the shorter longitudinal flange leftward circumferentially of said axis and has a forwardly facing surface extending leftward from and forwardly of the shorter longitudinal flange and circumferentially of said axis and arranged to engage the rear side of the aforesaid pin during the rotation of the valve to the right after the aforesaid rectilinear movement of the valve, both longitudinal flanges extending rearward from the circumferential flange, and the aforesaid pin extending between the longitudinal flanges in the fully open position of the valve.

In testimony whereof, I sign the foregoing specification, this 16th day of April, 1923.

JOSEPH A. COSTELLO.